United States Patent [19]
Knauer

[11] Patent Number: 4,800,101
[45] Date of Patent: Jan. 24, 1989

[54] METHOD FOR RESTORING AND MAINTAINING METAL MARKERS

[76] Inventor: Allen R. Knauer, 11375 N. 114th Dr., Youngtown, Ariz. 85363

[21] Appl. No.: 88,374

[22] Filed: Oct. 2, 1987

[51] Int. Cl.⁴ .............................................. B32B 35/00
[52] U.S. Cl. .................................... 427/142; 427/309; 427/327; 427/388.1; 427/409; 427/416
[58] Field of Search ............ 427/142, 309, 327, 385.5, 427/387, 416, 409, 388.1

[56] References Cited

U.S. PATENT DOCUMENTS 2,923,608 2/1960 Margulies ............................ 427/309
2,968,577 1/1961 Helling et al. ...................... 427/309

FOREIGN PATENT DOCUMENTS 2355576 5/1975 Fed. Rep. of Germany ...... 427/309
53-147638 12/1978 Japan .................................. 427/309
54-68785 6/1979 Japan .................................. 427/142
0152147 11/1981 Japan .................................. 427/309

*Primary Examiner*—Sadie Childs
*Attorney, Agent, or Firm*—James H. Phillips

[57] ABSTRACT

A method for restoring and preserving bronze gravestones is disclosed and calls first for cleaning the surface to remove any scale or corrosion present by applying a dilute acid solution to the bronze surface. Then, any raised features are roughly polished after which the entire surface is coated with marker stain which will ultimately provide a contrasting background to the raised features. After the marker stain has dried, it is selectively removed from the raised features which are then further polished with fine steel wool. A clear lacquer finish is applied over the surface and allowed to thoroughly dry, preferably overnight. The restoration process is completed by applying a unique liquid preservative mixture to the metal surface. One preferred embodiment of the preservative contains, by weight: paraffin—19%, mineral spirits—70%, lemon oil—3% and silicone—8% although other proportions are discussed and contemplated. Subsequently, the preservative is applied periodically to the marker and allowed to dry by dissipation of the mineral spirits. It has been found that, even in harsh environments, a monthly application of the preservative to a marker which has been restored according to the subject method will protect the marker indefinitely and will provide it, at all times, with a beautiful and legible appearance.

15 Claims, 1 Drawing Sheet

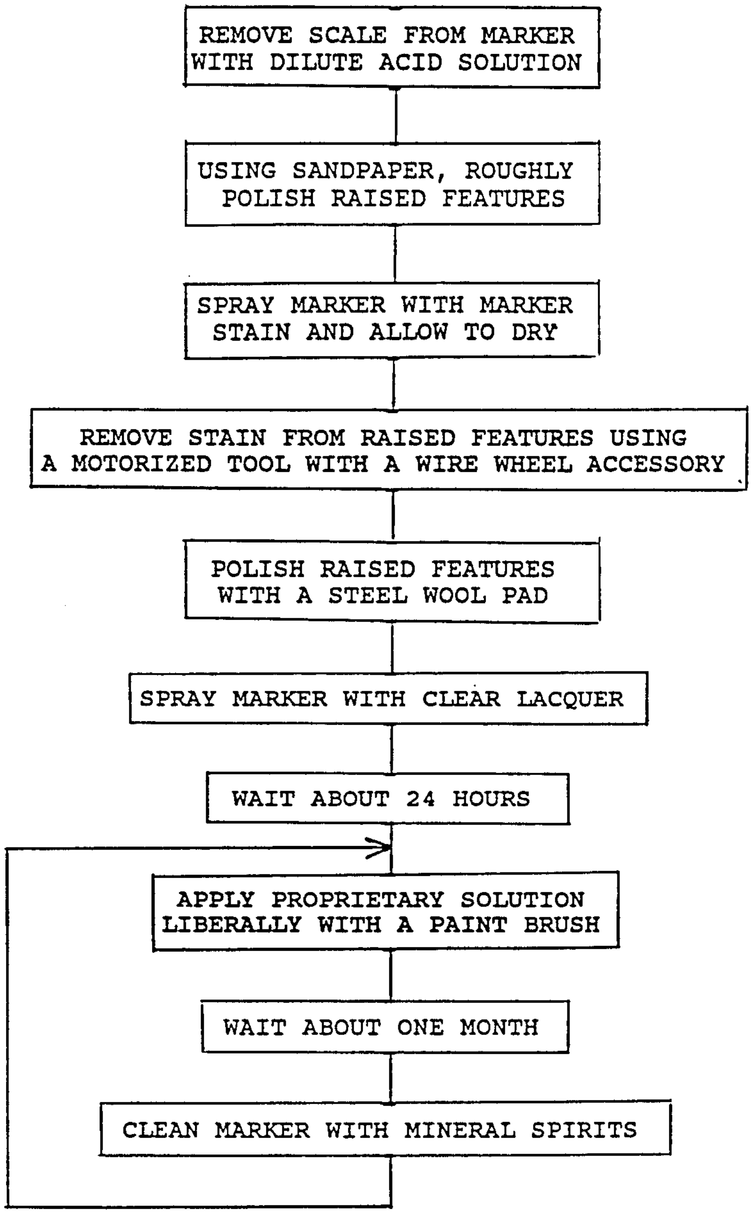
REMOVE SCALE FROM MARKER WITH DILUTE ACID SOLUTION
USING SANDPAPER, ROUGHLY POLISH RAISED FEATURES
SPRAY MARKER WITH MARKER STAIN AND ALLOW TO DRY
REMOVE STAIN FROM RAISED FEATURES USING A MOTORIZED TOOL WITH A WIRE WHEEL ACCESSORY
POLISH RAISED FEATURES WITH A STEEL WOOL PAD
SPRAY MARKER WITH CLEAR LACQUER
WAIT ABOUT 24 HOURS
APPLY PROPRIETARY SOLUTION LIBERALLY WITH A PAINT BRUSH
WAIT ABOUT ONE MONTH
CLEAN MARKER WITH MINERAL SPIRITS

METHOD FOR RESTORING AND MAINTAINING METAL MARKERS

FIELD OF THE INVENTION

This invention relates to the art of protecting surfaces exposed to the environment and has particular, although not exclusive, application to the art of restoring and maintaining metal markers, such as bronze gravestones, which are subjected to severe environmental forces.

BACKGROUND OF THE INVENTION

Markers, such as bronze gravestones, which are substantially totally unprotected from the ravages of the environment, typically present a good appearance for only a short time after they are emplaced. In point of fact, deterioration of the appearance commences almost immediately after emplacement and becomes visually evident within a few days. After months of environmental exposure, such markers have become decidedly unsightly; and, after years, the effects of corrosion and other processes working on the exposed metal marker leave an unpleasant and deteriorating sight. In the case of bronze gravestones, this deterioration is a source of annoyance and misgiving to relatives and friends of the deceased. Further, in cemeteries presenting an array of bronze gravestones, such deterioration is also distressing to the cemetery management since the overall appearance of the cemetery is adversely affected.

There are, of course, other metal markers which are also intended for long term emplacement which are especially subject to such undesirable deterioration. Merely by way of example, many states with historical roadways emplace bronze markers by the roadside to indicate the site of a historical event and to discuss the event. Often, these markers have become so deteriorated from the effects of the environment that they can hardly be read and, as well, are unbecoming to the event. Brass plaques are also widely used to identify buildings, etc., and brass is subject to the same sort of deterioration from long term exposure to the environment. Other uses of metal exposed to the environment and intended to present a good appearance over a long period will readily occur to those skilled in the art.

Thus, those skilled in the art will appreciate that it would be highly desirable to provide for the restoration (if needed) of metal markers and for periodic maintenance which will render the metal markers strikingly handsome, easy to read and very long lasting. It is to these ends that my invention is directed.

OBJECTS OF THE INVENTION

It is therefore a broad object of my invention to provide a method for restoring and maintaining metal markers, such as bronze gravestones, in order to maintain a very long lasting and beautiful appearance.

In another aspect, it is an object of my invention to provide a unique liquid preservative mixture for use during the restoration and preservation process.

SUMMARY OF THE INVENTION

Briefly, these and other objects of my invention are achieved by a method which calls first for cleaning the surface to remove any scale or corrosion present by applying a dilute acid solution to the surface. Then, any raised features, such as letters, are roughly polished using, for example, an abrasive such as "wet or dry" sandpaper. Next, the entire surface is coated with a material, such as marker stain, which will ultimately provide a contrasting background to the raised features. After the marker stain has dried, it is selectively removed from the raised features, preferably by employing a motor driven hand tool, and the raised features are then further polished with fine steel wool. Then, a clear finish, preferably lacquer, is applied over the surface in at least one coat and allowed to thoroughly dry, preferably overnight. The restoration process is completed by applying a unique liquid preservative mixture to the metal surface. The preservative contains, by weight: paraffin in the range 5–20%, mineral spirits in the range 70–94%, lemon oil in the range 1–10%, and a water repellent silicone in the range 0–10%. In a particularly preferred embodiment, the approximate proportions are: paraffin—19%, mineral spirits—70%, lemon oil—3% and silicone—8%. Subsequently, during the preservation phase of the process, the preservative is periodically applied to the marker and allowed to dry by dissipation of the mineral spirits. It has been found that, even in harsh environments, a monthly application of the preservative to a marker which has been restored according to the subject method will protect the marker indefinitely and will provide it, at all times, with a beautiful and legible appearance.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which the single figure is a high level flow chart of the presently preferred embodiment of the subject method.

DETAILED DESCRIPTION OF THE INVENTION

A fundamental feature of both the restoration and preservation phases of the method is the employment of a unique preservative mixture. In practice, this preservative appears to enjoy an effect which exceeds the expected results which might be obtained from the individual ingredients. The preservative includes three fundamental components and a fourth, highly desirable, optional component. The three fundamental components are paraffin, mineral spirits and lemon oil. The optional, but highly desirable, component is a water repellent silicone which will mix readily with mineral spirits containing paraffin.

A range of proportions of the various ingredients is contemplated. For example, the paraffin may be, by weight: 5–20%, the mineral spirits 70–94%, and the lemon oil 1–10%. The water repellent silicone may optionally be included in the range 0–10%. In one very successful and presently preferred embodiment, the components of the preservative are: paraffin 19%, mineral spirits 70%, lemon oil 3% and silicone 8%.

As those skilled in the chemical arts will understand, the water repellency of mixtures containing silicone results from the low critical surface tension produced by the methyl groups in the silicone that are oriented away from the metal surface. Polydimethylsiloxane is one basic polymer used in silicone repellents. Silicone is commonly supplied as an aqueous emulsion or as a solvent solution, and the proportions by weight discussed herein for the silicone component of the preservative refers to the material as supplied in emulsion or solution. One exemplary commercially available silicone which can be incorporated into the preservative mixture is "Silicon Fluid SWS-101" which is made available by SWS Silicone Corporation. Similarly, the proportion by weight of the lemon oil is calculated in the form in which it is commonly commercially available, and an exemplary applicable product is that sold under the trademark "Old English" by Doyle-Midway, Inc. of New York, N.Y.

Considerable care is necessary in preparing the preservative mixture, particularly in the handling of the paraffin. In preparing a batch of the preservative, the paraffin is melted and then slowly added to the mineral spirits with constant agitation of the mixture. When the paraffin/mineral spirits mixture has been uniformly prepared, the lemon oil, and (if used) the silicone, can be stirred in. In subsequent use, the preservative mixture is shaken or otherwise agitated prior to use.

Consider now the subject method for restoring metal markers. As the first step, the marker, whatever its condition, must first be cleaned substantially to "bare metal". This may involve the removal of scale, corrosion, dirt and other surface contaminants to produce a "bright" surface condition. This step can be undertaken using a mild dilute acid such as a 5% solution of muriatic acid. The metal surface is flooded with the dilute acid solution, and the entire surface area is worked with a paint brush or other appropriate tool to ensure that the scale, corrosion, dirt and other contaminants are worked out of all the tiny corners and crevices which may result from the raised features of the marker. In conjunction with this step, or as a substep, an abrasive, such as wet or dry sandpaper, may be employed to roughly polish the raised features of the marker.

After the marker surface has been rinsed and thoroughly dried, the entire outwardly facing marker surface is coated, preferably by spraying, with marker stain which is dark to ultimately provide a contrast to the raised features once the restoration procedure has been completed. The marker stain, selected for its fast drying properties, is allowed to dry for 10–15 minutes, and the stain is then selectively removed only from the raised features, preferably using a small motor driven tool fitted with a wire wheel accessory. Thus, by way of example, the marker stain would be removed from the outwardly facing surfaces of lettering which, ultimately, is to exhibit a light foreground color to contrast with the dark background. Next, the raised features are brought to a high polish, a step which can be easily accomplished with the manual application of a fine steel wool pad or the like.

At this point in the process, the appearance of the marker will be very attractive, but it is necessary to proceed promptly to the next step since, as those skilled in the art will appreciate, the undesired corrosion process will almost instantly commence to deteriorate the highly polished areas. Thus, the entire marker surface is promptly coated with a clear finish which is preferably clear lacquer. One or more coats may be applied with some drying time allowed between successive coats. However, after the final coat, and contrary to the usual practice with lacquer, it has been found to be desirable to wait several hours, preferably until the next day, to permit the clear lacquer to very thoroughly dry prior to undertaking the next step in the process.

After the clear lacquer has completely dried as discussed above, the preservative mixture previously described is generally applied and worked into all areas of the exposed marker surface, preferably using a paint brush. When the mineral spirits have evaporated, the remaining thin coating will protect the exposed surface of the marker against the deleterious effects of environmental forces for an extended period. In practice, it has been found that, in treating preserved bronze gravestones (perhaps the most difficult application of the subject method), the marker may be very reliably and indefinitely maintained by applying another generous coat of the preservative solution about once a month. Preferably, any dirt which has settled onto the marker surface is first flushed away using a paint brush dipped in mineral spirits before the maintenance coating of the preservative solution is applied.

It has also been found that the preservative mixture described above not only very satisfactorily meets the requirements of the subject method, but also makes a superb protective finish for any metal, painted or wood surface. Thus, it is highly useful as a furniture wax or as a preservative coating applied periodically to a vehicle finish or to any other similar finish subjected to the ravages of the environment.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A method for restoring and preserving a metal marker surface comprising the steps of:

(A) cleaning the surface; and (B) applying to the surface a preservative including, by weight:

paraffin: 5–20% mineral spirits: 70–94% lemon oil: 1–10%

2. The method of claim 1 in which the preservative employed in step (B) includes 0–10% by weight of a water repellent silicone which will mix readily with mineral spirits.

3. The method of claim 2 in which the proportions of the components of the preservative employed in step (B) are:

paraffin: 19% mineral spirits: 70% lemon oil: 3% silicone: 8%.

4. The method of claim 1 in which the metal surface has raised features and in which step (A) includes the substeps of sequentially:

(a) removing any scale and corrosion present on the surface by applying a dilute acid solution to the surface;

(b) coating the surface with marker stain and allowing the marker stain to dry;

(c) selectively removing the marker stain from the raised features of the surface;

(d) polishing the raised features in the areas from which the marker stain was removed during substep;

(e) applying to the surface at least one coat of a clear finish; and (f) allowing the clear finish to dry before step (B) is undertaken.

5. The method of claim 2 in which the metal surface has raised features and in which step (A) includes the substeps of sequentially:

(a) removing any scale and corrosion present on the surface by applying a dilute acid solution to the surface;

(b) coating the surface with marker stain and allowing the marker stain to dry;

(c) selectively removing the marker stain from the raised features of the surface;

(d) polishing the raised features in the areas from which the marker stain was removed during substep (c);

(e) applying to the surface at least one coat of a clear finish; and (f) allowing the clear finish to dry before step (B) is undertaken.

6. The method of claim 3 in which the metal surface has raised features and in which step (A) includes the substeps of sequentially:

(a) removing any scale and corrosion present on the surface by applying a dilute acid solution to the surface;

(b) coating the surface with marker stain and allowing the marker stain to dry;

(c) selectively removing the marker stain from the raised features of the surface;

(d) polishing the raised features in the areas from which the marker stain was removed during substep (c);

(e) applying to the surface at least one coat of a clear finish; and (f) allowing the clear finish to dry before step (B) is undertaken.

7. The method of claim 4 which includes an additional substep undertaken between substeps (a) and (b), said additional substep comprising polishing the raised features of the surface.

8. The method of claim 5 which includes an additional substep undertaken between substeps (a) and (b), said additional substep comprising polishing the raised features of the surface.

9. The method of claim 6 which includes an additional substep undertaken between substeps (a) and (b), said additional substep comprising polishing the raised features of the surface.

10. The method of claim 4 in which substep (e) is performed using a clear lacquer.

11. The method of claim 5 in which substep (e) is performed using a clear lacquer.

12. The method of claim 6 in which substep (e) is performed using a clear lacquer.

13. The method of claim 7 in which substep (e) is performed using a clear lacquer.

14. The method of claim 8 in which substep (e) is performed using a clear lacquer.

15. The method of claim 9 in which substep (e) is performed using a clear lacquer.

* * * * *

UNITED STATES PATENT AND TRADEMARK OFFICE
CERTIFICATE OF CORRECTION

PATENT NO. : 4,800,101

DATED : January 24, 1989

INVENTOR(S) : Allen R. Knauer

It is certified that error appears in the above-identified patent and that said Letters Patent is hereby corrected as shown below:

In Claim 4, subsection (d), insert ---(c)--- after "substep".

Signed and Sealed this

Sixth Day of June, 1989

*Attest:*

DONALD J. QUIGG

*Attesting Officer*

*Commissioner of Patents and Trademarks*